June 11, 1929.                G. G. BASTIAN                1,716,755
                          FLUID MIXING CHAMBER
                          Filed April 20, 1926
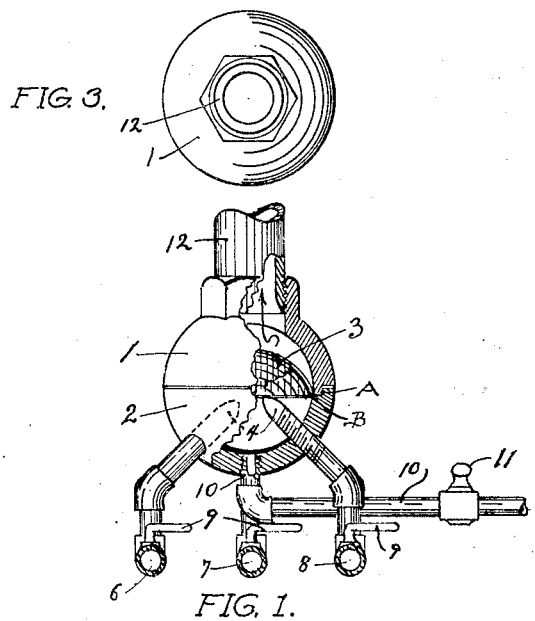
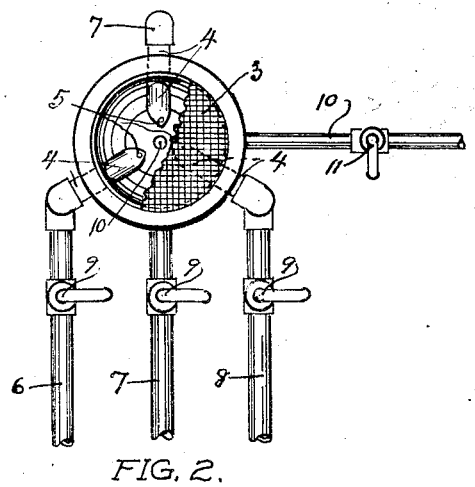
INVENTOR.
GLENN G. BASTIAN
BY
E. G. Charles
ATTORNEY.

Patented June 11, 1929.

1,716,755

UNITED STATES PATENT OFFICE.

GLENN G. BASTIAN, OF TOPEKA, KANSAS.

FLUID-MIXING CHAMBER.

Application filed April 20, 1926. Serial No. 103,278.

My invention relates to fluid mixing chambers and has for its chief object the provision of a plurality of tubes introducing different fluids which are atomized by a current of air.

A further object of my invention is to provide a mechanism for introducing different fluids into a mixing chamber simultaneously and as mixed by a current of air the solution is discharged by the same current through a tube for the purpose hereinafter described.

A still further object of my invention is to provide a mixing chamber reduced to a minimum size and having a simple accessible means for repairing, making changes and adjustments. These and other objects will be hereinafter more fully explained.

Referring to the drawings:

Fig. 1 is an elevation of a preferred type of mixing chamber with pipe connections, parts broken away for convenience of illustration.

Fig. 2 is a plan view of Fig. 1, the upper half of the chamber being removed, and a part of the screen broken away for convenience of illustration.

Fig. 3 is a plan view of Fig. 1 with the pipes removed.

The mechanism herein described consists of a spherical mixing chamber divided into hemispherical parts 1 and 2, the said parts threadedly connecting as at A. Positioned within said chamber is a metal gauzing 3 having a flange to extend into the joint of the chamber as at B and clamped firmly together. The gauzing is shown to be very coarse for convenience of illustration, but in reality the mesh is small. It will be understood that gauzing will be employed having different sized mesh to accommodate different kinds of fluids, some of which will contain pigment.

Member 2 of the mixing chamber is adapted to receive a plurality of tubes 4 radially positioned and having apertures 5 in the ends thereof, as discharging means for the fluid flowing through pipes 6, 7 and 8, said pipes having valves 9.

In the bottom of member 2 is an aperture threadedly receiving a pipe 10 functioning as an air supply for the mixing chamber hereinafter described. Positioned in this pipe line is a valve 11 for the control of the flow of the air.

In axial alignment with said aperture is a pipe 12 threadedly connecting with member 1, said pipe being adapted to connect with a burner, an air brush or the like. In said pipe may be placed a valve for the control of the flow of vapors, said valve not being shown, likewise the connecting means of the end of the pipe is not shown.

The operation of my invention when applied as a mixing device for fuel combustion is as follows:

It will be understood that the fuel supply may be by gravity or fed by the fluid being contained in a pressure chamber, however pipe lines 6 and 8 may discharge fuel oil of different gravity into the mixing chamber and simultaneously pipe line 7 will discharge water therein. By reason of the radial position of the tubes the flow of the fluids therefrom will contact in the center of the spherical chamber and simultaneously pipe line 10 will discharge a current of air at the same intersection forcing all of the fluids through the gauzing and from thence to a burner installed in a furnace or for other purpose. It will be understood that the air pressure may be produced by mechanical means as by a fan or from a compression chamber, and it will be further understood that fluids may be employed with such proportion of mixture to function as fuel for an internal combustion engine. Another application for the mechanism herein disclosed is that different colors of paint, stains or the like may be dispensed into the mixing chamber and atomized by the air pressure and discharged thereby to an air brush such as commonly used by portrait or landscape artists.

It will be understood that the amount of either color flowing through their respective pipes will be governed by the valves 9, by which means different tints may be obtained. Note that the gauzing placed between the ends of the tubes and the exit, pipe 12 is an element functioning as an assistant to the mixing means.

When the fluids contain pigment, the mesh of the gauzing should be rather coarse, otherwise it should be extremely fine. Such modifications may be employed as lie within the scope of the appended claim.

Having thus described my invention, what I claim as new and desire to secure by Letters Patent is:—

In an atomizing device, a hollow, spherical mixing chamber diametrically divided and threadedly engaging, and having a hemispherical or concave gauzing with an annular flange, the flange to engage in the joint at the division line of the spherical chamber, and an air pipe entering the same half of the chamber centrally, three tubes radially extending into one-half of the chamber and terminating in close proximity to each other by which means fluid dispensed through the tubes will contact in the center of the chamber and be forced through the gauzing by a current from the air pipe, and a valve on each of the tubes to govern the flow through the tubes equally or in varying porportions, and an exit pipe in axial alignment with the air pipe, all as and for the purpose described.

GLENN G. BASTIAN.